United States Patent [19]
Havens et al.

[11] Patent Number: 5,860,325
[45] Date of Patent: Jan. 19, 1999

[54] WAVE MOTION SIGN TRANSMISSION

[76] Inventors: Dale I. Havens, 11101 Devils Lake Hwy.; Jerry D. Havens, 15990 Heath Rd., both of Addison, Mich. 49220

[21] Appl. No.: 798,563

[22] Filed: Feb. 11, 1997

[51] Int. Cl.⁶ ............................. F16H 27/08; G09F 11/02
[52] U.S. Cl. .............................. 74/435; 74/411.5; 40/505
[58] Field of Search ........................... 40/505, 504, 503; 74/411.5, 435

[56] References Cited

U.S. PATENT DOCUMENTS

| | | |
|---|---|---|
| 1,399,409 | 12/1921 | Sleder . |
| 1,461,047 | 7/1923 | Ray . |
| 1,463,108 | 7/1923 | Willison et al. . |
| 1,785,204 | 12/1930 | Nelson et al. . |
| 1,865,725 | 7/1932 | Raves . |
| 2,277,323 | 3/1942 | Hjermstad et al. . |
| 2,823,561 | 2/1958 | Opocensky .......................... 74/411.5 X |
| 5,161,421 | 11/1992 | Stigsson . |
| 5,511,330 | 4/1996 | Havens . |

*Primary Examiner*—Cassandra Davis
*Attorney, Agent, or Firm*—Duncan F. Beaman

[57] ABSTRACT

A transmission system for louver type signs wherein the signs consist of a plurality of multiple faced louvers having indicia defined thereon and the side-by-side relationship of the louvers permits pre-selected faces to define a completed image. The adjacent transmissions are operated by a constantly rotating drive shaft and the louvers may be simultaneously rotated or may sequentially operate in a delayed manner wherein the indicia on the louvers is progressively revealed in a "wave" manner. The drive shafts of adjacent transmissions are interconnected and a plurality of transmissions are operated by a single constantly operating motor drive source, and in the disclosed embodiment, a complete rotation of the transmission's drive shaft produces one-third of a rotation of the output shafts operating the louvers. A positive detent lock operated by a cam formed on the drive shaft gear produces a positive locking of the output shaft and the position of the louver, and the detent is automatically engaged and released in the proper sequence by the cam.

5 Claims, 1 Drawing Sheet

FIG. 1
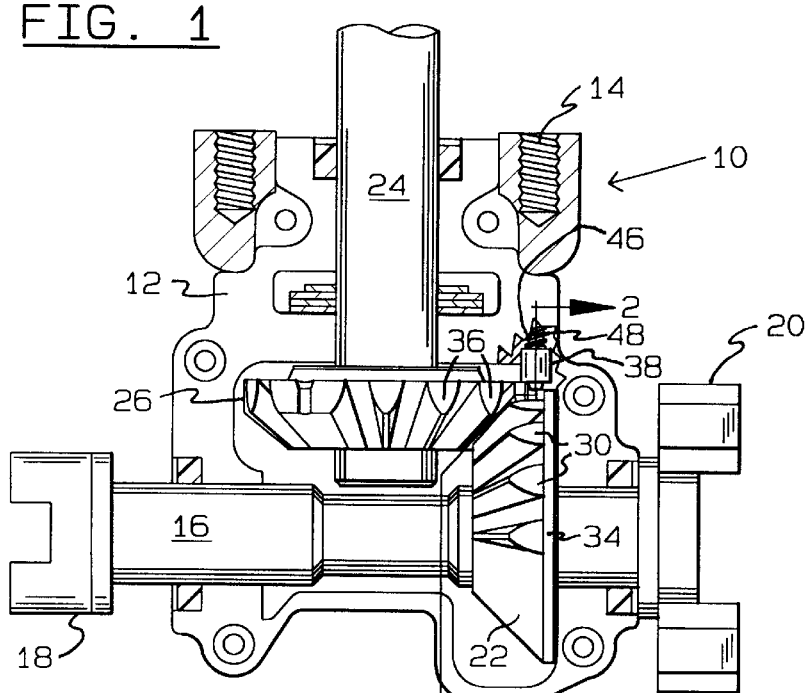
FIG. 4
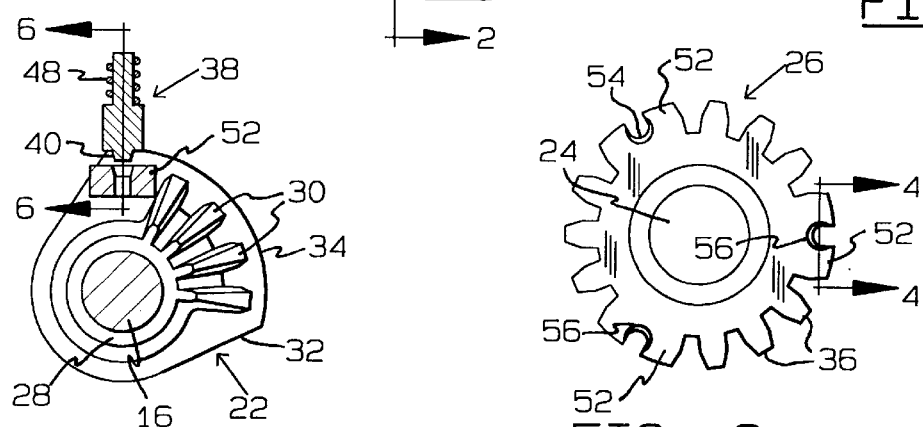
FIG. 2    FIG. 3
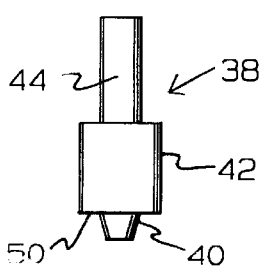
FIG. 5
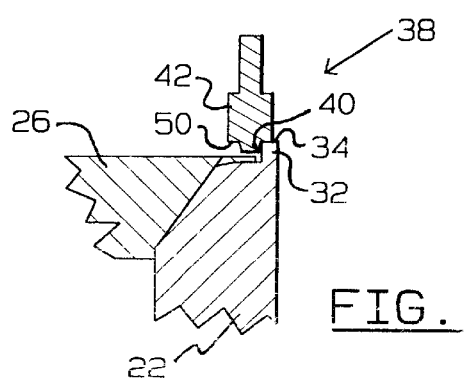
FIG. 6

WAVE MOTION SIGN TRANSMISSION

BACKGROUND OF THE INVENTION

1. Field of the Invention

The invention pertains to gear transmissions for louver type signs wherein a plurality of multi-faced elongated louvers having indicia or images appearing thereon are indexed and a plurality of transmissions are driven by a single constantly rotating power source.

2. Description of the Related Art

With a louver type sign, a plurality of long and narrow elements or louvers are mounted in side-by-side relationship and the louvers are indexed to present different faces having indicia defined thereon whereby upon the coplanar alignment of predetermined faces a desired image is produced. The longitudinal edges of adjacent louvers are closely spaced as to permit a continuity of the image appearing on a plurality of adjacent louver faces. Usually, the louvers are provided with three sides or faces and the louvers are usually indexed in a predetermined time cycle as to permit a different louver face to be visible each 30 seconds or so.

It has been the usual practice to simultaneously rotate or index the louvers constituting a complete sign by a belt or chain arrangement operated by an intermittently energized electric motor.

However, it is known to index adjacent louvers with a constantly rotating drive shaft for simultaneous operation or wherein the images defined thereon sequentially become visible and the total image is revealed in a "wave" adding interest to the sign and attracting the viewer's attention for a longer duration, thereby rendering the sign particularly effective.

With constant drive rotation signs and with sequential or wave louver type signs, it is important that the louvers be locked during each indexing to assure alignment of adjacent faces, and to prevent inadvertent partial rotation of the louvers due to external forces, such as wind. In order to lock such indexed louver signs in the desired position, it is known to mount a locking member on the transmission drive shafts which periodically engages a gear mounted upon the transmission output shaft upon which the louvers are mounted, please see U.S. Pat. No. 5,161,421 wherein such a lock mounted upon the transmission drive shaft intermittently meshes with the output shaft gear teeth.

The locking arrangement of the aforementioned patent has the disadvantage of incorporating excessive "play" in the index locking structure because of the necessity of the drive shaft mounted lock to intermesh with the output shaft gears. Such "play" may result in a slight misalignment, and permit a louver to slightly vibrate under high wind conditions, and such vibration is very apparent to the viewer detracting from the desired visual effect.

OBJECTS OF THE INVENTION

It is an object of the invention to provide a louver type sign transmission system of the gear driven type wherein the drive shaft of the transmission is constantly rotated and the louver supporting output shaft is intermittently rotated or indexed, and the output shaft is locked in a positive manner during non-rotation preventing any oscillation or vibration of the output shaft and the associated louver.

Another object of the invention is to provide a transmission system for louver type signs wherein the transmission drive shaft is constantly rotated and includes a partial gear having teeth periodically engaging the teeth of an output gear mounted upon the transmission output shaft upon which the louvers are mounted and wherein a cam mounted upon the drive shaft gear engages and operates a spring biased detent which, in its normal position, prevents rotation of the output shaft and driven gear, but is released by the cam prior to rotation by the drive shaft gear teeth.

A further object of the invention is to provide a transmission for a louver type sign having an intermittently rotated louver mounted output shaft and a constantly rotated input shaft and wherein the output shaft is firmly and accurately positioned in each indexed position, but is fully released during rotation.

SUMMARY OF THE INVENTION

In the practice of the invention, a louver sign is formed by supporting a plurality of three sided louvers in adjacent relationship whereby coplanar alignment of adjacent louver faces permits the indicia defined on the faces to be viewed as a whole. Each louver is rotated by a separate transmission, adjacent transmissions being interconnected, and each transmission includes a drive shaft connected to the adjacent transmission drive shaft and all the drive shafts are rotated at a constant rate of rotation.

Partial gears mounted upon the drive shafts engage teeth defined on gears mounted upon the transmission output shafts during each rotation of the drive shaft indexing the output shaft and the associated louver, the degree of output shaft rotation being dependent upon the number of drive shaft gear teeth engaging with the output shaft gear. Usually, each rotation of the drive shaft produces a 120° indexing of the output shaft.

A cam mounted upon the drive gear engages a spring biased detent mounted in the transmission housing which accurately engages lock surfaces defined on the output shaft gear to prevent rotation of the output shaft, and associated louver, when the detent is in its locked position. Engagement of the cam with the detent lifts the detent from its output shaft gear engagement simultaneously to the drive shaft gear teeth engaging the output shaft gear teeth permitting a smooth rotation of the output shafts during the indexing process. After indexing is complete, the cam releases the detent permitting the detent to again accurately engage the locking surfaces defined on the output shaft gear, and the output shaft and louver will be locked in its indexed position until the detent is again released by the drive shaft mounted cam.

BRIEF DESCRIPTION OF THE DRAWINGS

The aforementioned objects and advantages of the invention will be appreciated from the following description and accompanying drawings wherein:

FIG. 1 is an elevational view, partially broken, of a louver type sign transmission in accord with the invention with one-half of the transmission casing removed to permit viewing of the transmission interior, the locking detent being shown in the locked position, FIG. 2 is an elevational sectional view taken along Section 2—2 of FIG. 1 illustrating only the drive shaft gear and locking detent and associated structure, the detent being shown in the locked position, FIG. 3 is a plan view of the output shaft gear, per se, as viewed from above with respect to FIG. 1, FIG. 4 is an enlarged elevational sectional view taken through the driven gear bridge along Section 4—4 of FIG. 3, FIG. 5 is an elevational view of the locking detent, per se, and FIG. 6 is an enlarged sectional view of the detent, cam, and drive and driven gears illustrating the detent being lifted to its unlocked position.

DESCRIPTION OF THE PREFERRED EMBODIMENT

A louver type sign transmission in accord with the invention has many similarities to the transmission disclosed in applicant's U.S. Pat. No. 5,511,330, and the disclosure of this patent is herein incorporated by reference. A sign transmission in accord with the instant invention will be used in a louver sign application such as that shown in U.S. Pat. No. 5,511,330, and adjacent transmissions may be interconnected in the manner shown in such patent. Also, the bearing structure and other novel features shown in the patented transmission are incorporated into the transmission of this application where equivalent results are desired.

As will be appreciated from FIG. 1, a transmission 10 in accord with the invention may consist of a cast housing 12 formed of two parts, the part nearest the viewer being removed for purpose of illustration. The housing 12 is mounted to the underside of the louver sign frame by bolts, not shown, extending into mounting holes 14.

The transmission 10 includes a drive shaft 16 which extends through the lower portion of the housing having ends extending from the housing and a connector 18 is mounted upon one drive shaft end while the connector 20 is mounted upon the other shaft end. The connectors 18 and 20 are drivingly interconnected to the connectors of adjacent transmissions, as appreciated from U.S. Pat. No. 5,511,330.

Drive shaft 16 includes a drive gear 22 affixed thereon, and the transmission also includes an output shaft 24 perpendicularly related to the drive shaft 16 upon which the driven gear 26 is mounted. As will be appreciated from the following description, the teeth of gears 22 and 26 intermittently engage to rotate the drive shaft 24 between its indexed positions.

As best apparent in FIG. 2, the drive gear 22 includes a hub 28 circumscribing the drive shaft 16, and four gear teeth 30 are defined upon the hub 28. A periphery 32 is defined upon the right end of gear 22 as shown in FIG. 1, and the periphery 32 includes a cam surface 34 concentric to the axis of the drive shaft 16.

The driven gear 26 mounted upon the output shaft 24 may include conventionally cut teeth 36 which selectively mesh with the drive gear teeth 30, but preferably, the driven gear 26 includes teeth 36 located between bridges defined on the gear periphery as will be appreciated from FIG. 3.

The gear 26 mounted upon the output shaft 24 is locked in its indexed positions by a detent 38, FIG. 5, which includes a conical point 40, a cylindrical head 42 and a cylindrical stem 44 of a lesser diameter than the head 42. A bore 46 defined in the transmission casing 12 slidably receives the detent 38 and a spring 48 surrounding the stem 44 bearing against the blind end of the bore 46 tends to bias the detent 38 toward the driven gear 26.

The detent head 42 defines a radial shoulder 50 which aligns with the drive gear periphery 32 and cam 34, FIG. 1, for operation as later described.

The driven gear 26 mounted on the output shaft 24 preferably includes three bridges 52 having some similarity to a tooth 36, but of a greater circumferential dimension, and a bore 54 is defined within each of the bridges 52 as will be appreciated from FIG. 4. The end of the bore 54 disposed toward the detent 38 is of a conical configuration complementary to the conical form of the detent point 40 and constitutes a detent point stop for closely receiving the detent point.

In operation, the drive shaft 16 will be continuously driven by its power source, not shown, such as an electric motor, the drive shaft being driven in a uniformly rotating manner as connected to the drive shaft of adjacent transmissions. As the drive shaft 16 rotates, the drive gear 22 will rotate, but as the cam 34 is presumed to be out of engagement with the detent shoulder 50, the detent 38 will be in its operative locking position as shown in FIGS. 1 and 2 wherein the detent point 40 will be firmly nested within the detent point stop 56 defined in the output shaft driven gear 26. The engagement of the detent point 40 with the stop 56 will accurately position the output shaft so that the louvers mounted thereon, not shown, will be positioned as desired.

As the drive gear 22 rotates, the cam 34 will engage the detent shoulder 50 raising the detent from its stop 56 and compressing the spring 48. This relationship is shown in FIG. 6. The cam 34 is related to the drive gear teeth 30 such that the detent point 40 will be partially removed from the stop 56 slightly before the teeth 30 mesh with the driven gear teeth 36. Further movement of drive gear 22 fully disengages detent point 40 from stop 56 and the drive gear 30 mesh with gear teeth 36 to rotate driven gear 26 and the output shaft 24 and the associated louvers. The degree of indexing of the shaft 24 is directly related to the number of teeth 30 formed on the drive shaft. In the disclosed embodiment, four teeth 30 are shown and three teeth 36 are defined on the driven gear between the bridges 52. This tooth ratio results in a 120° indexing of the output shaft 24 for each complete rotation of the drive shaft 16.

After the driven gear 26 has been indexed, and of course, during indexing the cam 34 engages the detent shoulder 50 to maintain the detent in its raised unlocked position, the cam 34 will disengage from the detent shoulder 50 permitting the detent point 40 to engage with the "next" detent point stop 56 which locks the output shaft against further rotation. Accordingly, it will be appreciated that the inventive concept provides a positive locking of the output shaft intermediate indexing operations, and such use of the detent permits a very accurate and positive positioning and maintaining of the louver face.

The concepts of the invention may be utilized to permit a continuously operating motor to drive the transmissions and index the output shafts during each rotation of the drive shaft, and the concepts of the invention may be used wherein it is desired to rotate all of the louvers of the sign simultaneously, or the inventive concept may also be employed with "wave" signs wherein the louvers sequentially index to increase the duration of the revealing of the louver faces to retain the observer's attention. Such a "wave" operation of adjacent transmissions is produced by rotatably misaligning the drive gears of adjacent transmissions so that the driven gears are sequentially operated.

It is appreciated that various modifications to the inventive concepts may be apparent to those skilled in the art without departing from the spirit and scope of the invention.

We claim:

1. A louver continuously driven sign transmission for a louver sign having a plurality of parallel, rotatable, adjacent louvers each having a plurality of indicia receiving surfaces and ends capable of rotatably indexing adjacent louvers, comprising, in combination, a transmission housing, said transmission housing including a drive shaft and an output shaft, gearing interconnecting said shafts, said drive shaft and said output shaft each having an axis of rotation and the axes of rotation of said shafts of said transmission being substantially perpendicular to each other, said drive shaft having an exterior accessible input end portion and an output end portion, a torque transmitting connector mounted upon said drive shaft end portions, said transmission output shaft adapted to have a louver end support mounted thereon for supporting a louver end whereby said transmission output shaft is adapted to rotate the louver end associated therewith upon rotation of said output shaft, said gearing interconnecting said shafts including a first toothed gear mounted upon said drive shaft and a second toothed gear mounted on said output shaft, the teeth of said first gear being circumferentially interrupted whereby said second gear and said output shaft are rotatably indexed between index positions during each rotation of said drive shaft, a detent mounted on said housing movable between a lock position locking said output shaft against rotation and a release position permitting rotation of said output shaft, and a detent operator mounted upon said drive shaft selectively positioning said detent between said lock and release positions during rotation of said drive shaft whereby said detent is in said release position during engagement of the teeth of said first and second gears and is in said lock position when the teeth of said first and second gears are disengaged.

2. In a louver sign transmission as in claim 1, said detent comprising an elongated pin reciprocally mounted in said transmission housing movable between said lock and release positions, and said detent operator comprises a cam drivingly connected to said drive shaft engaging said detent during each rotation of said drive shaft.

3. In a louver sign transmission as in claim 2, said detent engaging said second toothed gear in said lock position preventing rotation thereof.

4. In a louver sign transmission as in claim 3, a plurality of evenly circumferentially spaced openings defined in said second toothed gear, said detent being received within one of said openings when in said lock position.

5. In a louver sign transmission as in claim 2, said cam being defined on said first toothed gear, a cam engageable surface defined on said detent in alignment with said cam, said cam being engageable with said cam engageable surface to move said detent from said lock position to said release position, a spring means biasing said detent toward said lock position.

\* \* \* \* \*